Nov. 5, 1940.    R. R. PITTMAN ET AL    2,220,615
ELECTRIC TRANSFORMER STRUCTURE
Filed Jan. 24, 1938    2 Sheets-Sheet 1
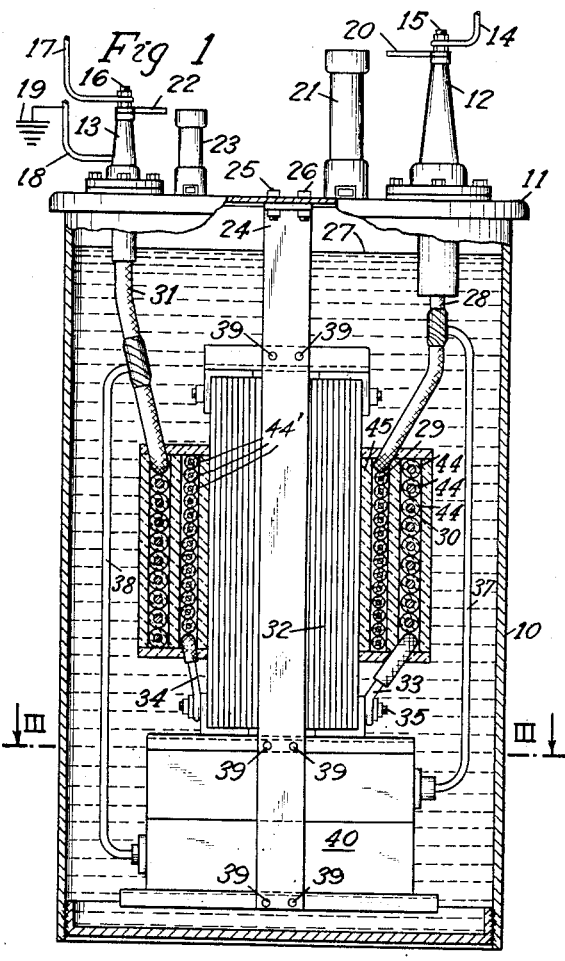
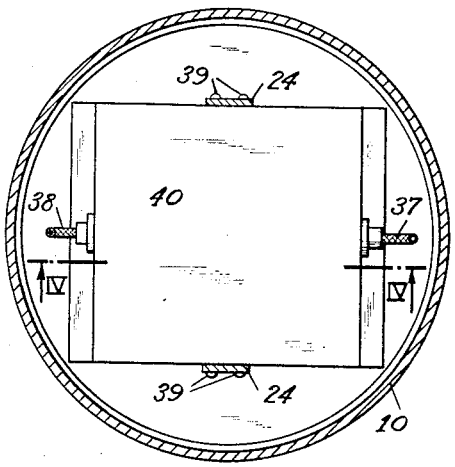
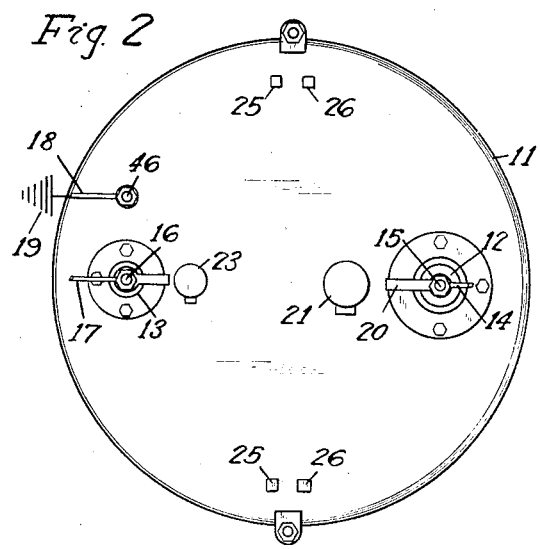
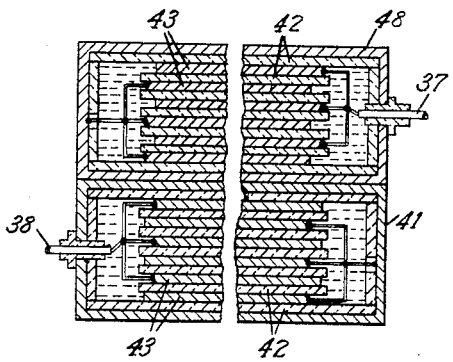
INVENTORS
Ralph R. Pittman
Carroll H. Walsh Nov. 5, 1940.   R. R. PITTMAN ET AL   2,220,615
ELECTRIC TRANSFORMER STRUCTURE
Filed Jan. 24, 1938    2 Sheets-Sheet 2
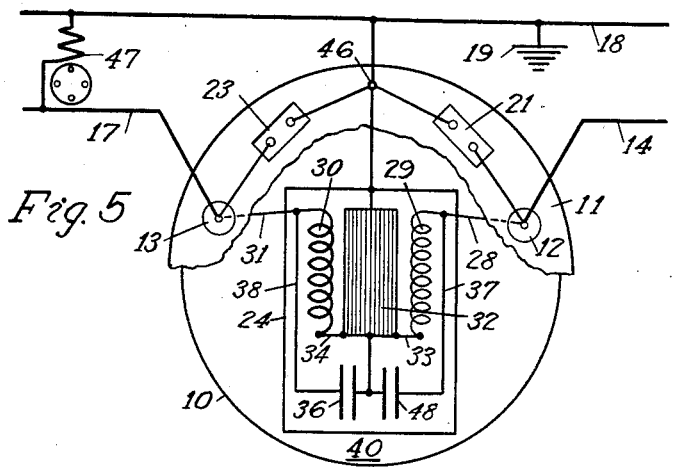
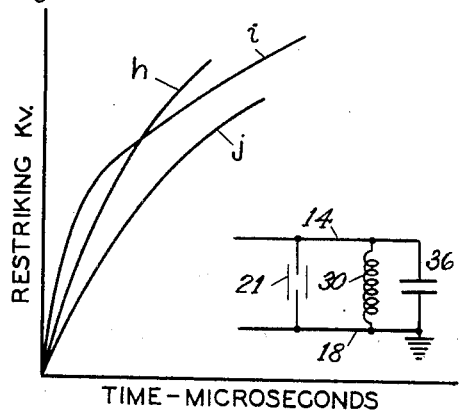
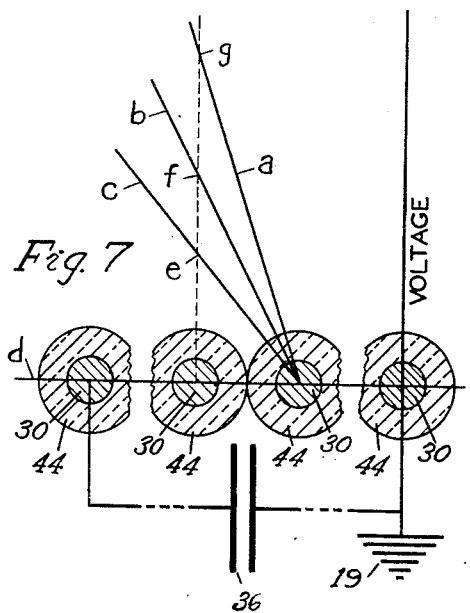
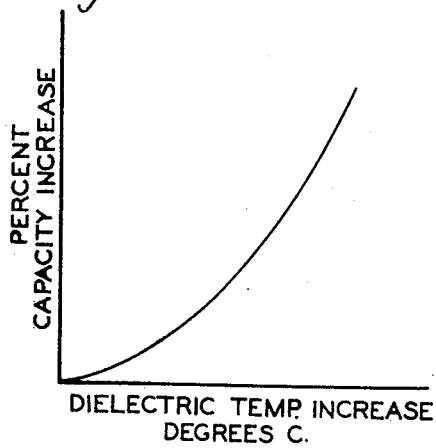
INVENTORS
Ralph R. Pittman
Carroll H. Walsh Patented Nov. 5, 1940

2,220,615

UNITED STATES PATENT OFFICE 2,220,615

ELECTRIC TRANSFORMER STRUCTURE

Ralph R. Pittman and Carroll H. Walsh, Pine Bluff, Ark.

Application January 24, 1938, Serial No. 186,604

3 Claims. (Cl. 175—361)

Our invention relates to distribution transformers embodying means for protecting the insulation of such transformers against damage from abnormal voltages and also against damage from excessive heating due to energy loss.

A distribution transformer is usually connected to an overhead electric line exposed to abnormal impulse voltages such as may be due to lightning, and the line therefore conducts the impulse voltages to the transformer winding. The insulation of the winding of the transformer is subjected to these voltages, and may fail from two distinct causes; (1) the voltage may be too great to be withstood by the insulation positioned between the winding and a grounded member, and (2) the rate of rise of the applied voltage may be too great to be withstood by the insulation from turn to turn, or coil to coil, within the winding. It has long been common practice to provide some device, usually referred to as a lightning arrester, to limit the voltage from winding to ground, which device may be either installed on the transformer casing or on the structure on which the transformer is mounted. The lightning arrester so arranged provides only a partial solution to the problem, since its effect is to limit the magnitude of the abnormal voltage, rather than the rate of rise. Certain shielding arrangements have been heretofore proposed to establish a uniform voltage gradient throughout the winding rather than to specifically limit the rate of rise, but each of these arrangements is incorporated in the winding structure, or so related thereto as to restrict the cooling of the winding.

It is therefore one of the objects of the invention to provide means for limiting both the magnitude and rate of rise of voltage to which the insulation of the transformer may be subjected, the rate-of-rise limiting means being so combined with the transformer as not to impair the cooling of the winding.

A further object is to provide a unitary structure, capable of being installed and removed from the transformer tank as a unit, which structure embodies a capacitor, in shunt relation with the winding, of such surge impedance as to reduce the rate of rise of abnormal voltages reaching the winding.

A further object is to provide such a capacitor in the circuit so that it will normally draw leading current with respect to the voltage from the connected line to thereby neutralize the lagging current inherently required by the transformer excitation.

A further object is to provide, as a part of the transformer assembly, a capacitor which has a dielectric such that its electrical capacity increases with rise in temperature of the transformer winding, so that the electrical capacity of the capacitor increases as the load on the transformer increases.

Capacitors have been widely used for increasing the inherently poor power factor due to the inductive effect of transformers connected to distribution circuits. Heretofore such capacitors have been installed as separate units, requiring a separate tank, insulation, mounting, and connections, and therefore operate as separate devices substantially independent of transformer loading. It is most desirable to use only one device which may be installed and removed as a unit, and in which the load on the transformer, as expressed in the rise of temperature of the liquid dielectric of the transformer, cooperates with the capacitor to correspondingly increase its electrical capacity.

It is therefore an object of the present invention to provide a transformer structure, embodying a capacitor, in which the windings of the transformer and the dielectric of the capacitor are maintained at all times above the ambient temperature of the surrounding medium, and at the same temperature under all conditions.

It is a further object to provide an arrangement in which the capacitor, as combined above with the transformer, acts to reduce the recovery voltage impressed on the connected lightning arrester, whereby to prevent restriking of the arc following sparkover, and thus cause its rapid extinguishment.

With these and other objects which will be apparent from the following description and claims taken in connection with the accompanying drawings forming a part of this application, our invention resides in the novel construction, and the combination of the elements, of the structure, in which certain elements perform a plurality of functions to thereby attain the objects with a minimum of parts.

In the drawings:

Fig. 1 is an elevational view of an embodiment of the invention, shown in section.

Fig. 2 is a top view.

Fig. 3 is a section along the line III—III of Fig. 1.

Fig. 4 is a section along the line IV—IV of Fig. 3.

Fig. 5 is a schematic diagram showing the electrical connections.

Fig. 6 is a diagram of a curve showing the effect of the capacitor upon dynamic recovery voltage.

Fig. 7 is a fragmentary view of the winding of the transformer, shown diagrammatically with respect to voltages and connections.

Fig. 8 is a diagram of a curve illustrating a characteristic of the capacitor.

Referring first to Figs. 1, 2, 3, and 4, a cylindrical metal tank or conducting casing 10 is fitted with and in electrical connection with a circular metal and conducting cover 11. A high-voltage bushing of insulating material 12, and a low-voltage bushing of insulating material 13, extend vertically through the cover 11, in spaced relationship. An insulated conductor 28 extends downwardly through the bushing 12 in insulated relationship with the cover 11 from the terminal 15, and a high-voltage line conductor 14 extends away from the terminal 15 outside of the casing 10. Similarly, the insulated conductor 31 extends through the low-voltage bushing 13 from the terminal 16, and a low-voltage line conductor 17 extends away from the terminal 16 outside of the casing 10. The cover 11 is electrically connected by means of the terminal 46 to ground, illustrated schematically at the numeral 19, through the conductor 18, the latter being also extended as a grounded neutral conductor of an electric distribution system.

The conductors 14 and 17 may be subjected to abnormal impulse voltages of very high magnitude, such as may be caused by lightning discharges. The magnitude of such voltages with respect to ground is limited by means of the high-voltage and low-voltage lightning arresters, or self-extinguishing arcing gaps 21 and 23, respectively, which have their lower ends electrically engaged with and mechanically secured to the cover 11. The high-voltage and the low-voltage arcing electrodes 20 and 22 respectively extend from the high and low voltage terminals 15 and 16 in spaced relationship with the tops of the arcing gaps to provide preferential spark paths from the respective conductors to ground, and to limit the magnitude of voltage at the terminals 15 and 16 to a predetermined value less than the dielectric strength of the winding insulation from conductor to ground.

Rigidly secured to the cover 11 by means of the bolts 25 and 26, and extending downwardly therefrom within the tank 10, is the metal and conducting supporting structure 24, to which is rigidly secured, by means of the rivets 39—39, an assembly including the insulated high-voltage winding 29, the insulated low-voltage winding 30, the magnetizable conducting core 32, and the capacitor 40. The lower end of the low-voltage winding 30 is electrically connected to the conducting core 32 through the conductor 33 and the bolt 35, and the lower end of the high-voltage winding 29 is similarly connected to the conducting core 32 through the conductor 34. The capacitor 40 is preferably, but not necessarily, divided into upper and lower sections, 48 and 36 respectively, one terminal of the upper section 48 being connected to the conductor 28 through the conductor 37, and one terminal of the lower section 36 to the conductor 31 through the conductor 38, the remaining terminals being electrically connected to the cover 11 through the conducting casing 41, the conducting core 32, and the conducting support 24. The assembly just described is submerged in a liquid insulating material, the level of which is indicated at 27. The liquid may be oil or any substance having dielectric qualities and suitable flow qualities for maintaining all parts in the tank and submerged in the liquid at substantially the same temperature.

For best results, the capacitor 40 includes the conducting plates or sheets 43, separated and insulated by the dielectric 42, the latter being of some cellulosic material, such as linen or pulp paper. The insulating liquid in the capacitor is preferably the same material as that in the tank 10, but, if desired, the casing 41 may be tightly sealed, and a liquid of differing characteristics used with the capacitor.

From the above description, it may be seen that our transformer comprises an assembly removable from the tank as a unit, the assembly being removable along with the cover, and including the high-voltage winding, the low-voltage winding, the core, and the capacitor. The physical position of the capacitor with respect to the winding is such that the heat due to energy loss in the winding is readily carried in convection currents in the liquid to the wall of the tank, and there radiated to the atmosphere, this action being unimpaired or unimpeded by the presence of the capacitor below the winding. The cover being circular, the entire assembly may be rotated with respect to the tank to adjust the bushings and terminals as desired.

The electrical arrangement of the preferred construction is illustrated in Fig. 5, which shows the high-voltage winding 29 energized from the supply circuit conductors 18 and 14, and an inductive load 47 connected to the low-voltage winding 30 through the load circuit conductors 18 and 17. As here illustrated, the excess-voltage protective device 21 is in shunt circuit relation with the high-voltage winding 29 for limiting the magnitude of the voltage between the line conductor 14 and ground 19, and therefore from the high-voltage winding 29 to ground 19. Obviously, to prevent failure of the high-voltage winding 29 to ground 19, the major or line-to-ground insulation 45 and 44' (Fig. 1) must have an electrical strength greater than that of the path to ground through the protective device 21. This is a well known arrangement of over-voltage protection. The capacitor 48 is also in shunt relation with the high-voltage winding 29. A similar arrangement is provided in connection with the low-voltage winding 30.

The electrical performance of this arrangement when subjected to abnormal impulse voltages is illustrated in Fig. 6. The arc-discharge device 21, in order to prevent outages on the connected supply circuit when it sparks over due to excess-voltage, incorporates some means for extinguishing the dynamic arc which may follow sparkover. A suitable arc-extinguishing device for this purpose is that described in Patent No. 2,002,042, issued to Ralph R. Pittman, dated May 21, 1935. This device, in common with all arc-discharge devices, has an envelope of restrike, above which the arc will not be extinguished, the envelope being expressed in rate-of-rise of voltage, and shown as the line $i$ of Fig. 6. The line $h$ of this figure represents the rate-of-rise of recovery voltage without the capacitor 48. This quantity represents the stored magnetic energy in the reactance of the circuit, and therefore is a function of the total reactance due to inductive effects. It may be observed that this line extends above and beyond the envelope of restrike $i$, and consequently, under the illustrated conditions, the arc will restrike at each alternation of an alternating current. If, however, the capacitor 48 is connected in shunt with the arc-extinguishing device 21, its capacitance neutralizes such a portion of the inductance of the circuit that the stored magnetic energy is decreased, and the recovery rate illustrated by the line *j* may result. Since this line is entirely below the envelope or limit of restrike, the arc cannot restrike, and therefore is extinguished at the first current zero.

Remembering that the insulation between turns in a transformer winding has a predetermined dielectric strength, reference is made to Fig. 7, which illustrates a fragmentary section of the winding 30. The line *d* of this diagram may be regarded as a time axis, and the ordinate as voltage. Assuming that a voltage having the rate of rise illustrated by the line *b* will impress sufficient voltage *f* between adjacent turns to cause insulation failure, it will be obvious that a voltage *g* resulting from the steeper rate of rise *a* will cause failure. The above conditions may exist in the absence of the capacitor 36. With the capacitor 36 introduced in shunt relation with the winding 30, the rate of rise is sloped to the value *c*, resulting in a voltage *e* across adjacent turns, which value is substantially below the dielectric strength of the turn-to-turn insulation. The action of the capacitor 36 is not to reduce the total energy of the abnormal voltage wave, but to delay the rise thereof, resulting in a longer and lower, and therefore less harmful wave.

In addition to the advantages gained in the matter of excess-voltage protection of winding insulation, our structure also utilizes the inherent heating of the core and coils of the transformer to increase the electrical capacity of the capacitor. With no load on the transformer, the excitation losses maintain the liquid in the tank above the ambient temperature of the surrounding medium. Since the capacitor and windings are both submerged in the same cooling medium, they are at all times substantially at the same temperature. An electric transformer is inherently an inductive device, and therefore always operates at a lagging power factor. In addition, the load generally includes induction motors or other devices which also inherently operate at a lagging power factor, and the temperature of the transformer is increased in response to a loading of poor power factor. It is therefore most advantageous to arrange a capacitor having a temperature-responsive dielectric such that its electrical capacity increases with increasing load on the winding. This we accomplish by employing a capacitor, positioned in the insulating liquid with the core and windings, which embodies a paper or cellulosic dielectric. Fig. 8 illustrates a characteristic of a preferred type of capacitor, showing the manner in which the capacitance increases with the temperature of the dielectric. With such a structure, increasing leading current is drawn from the supply circuit by the capacitor as increasing lagging current is drawn by the increasing inductive load, resulting in an increased power factor on the connected circuit.

In addition to the advantages above mentioned which are attained by the use of our construction, it may be pointed out that, when the transformer structure is disconnected from the supply circuit, the winding remains electrically connected in shunt relation with the capacitor, and any residual charge in the capacitor is discharged through the winding. This feature eliminates the necessity of employing discharge resistors or devices to make capacitors safe to manually handle following disconnection, such as are now in common use with separately mounted capacitors.

From the above description of our invention and the explanation of its operation, it will be clear from the electrical cooperation and the physical combination of the elements that we provide an economical and effective transformer structure new in the art, and having many advantages over present constructions.

Although we have shown but one embodiment of our invention, it will be evident to those skilled in the art that other forms or modifications may be employed without departing from the spirit of this invention as described above or as set forth in the appended claims.

We claim as our invention:

1. In an electric transformer having a conducting casing, a removable conducting cover fitted on said casing, conducting structural means secured to said cover and extending downwardly therefrom within said casing, said structural means having mounted thereon an assembly comprising an insulated high-voltage winding, an insulated low-voltage winding, a magnetizable conducting core associated with said windings, and a capacitor associated with at least one of said windings; means for connecting one end of said last-named winding to a conductor exposed to excess-voltages, means for connecting the other end of said winding to said conducting core, means within said casing for connecting said capacitor in parallel with said last-named winding, said last-named winding being susceptible to damage due to an excess-voltage of predetermined magnitude impressed between a connected conductor and casing, and said last-named winding also being susceptible to damage due to voltage from said connected conductor having a predetermined rate of increase within said last-named winding, excess-voltage protective means connected in shunt circuit relation with said winding and embodying spaced normally insulated conducting electrodes arranged to provide arcing gaps between the connected conductor and casing for limiting the magnitude of excess-voltage to a value less than said predetermined magnitude, said excess-voltage means also embodying arc extinguishing means effective for extinguishing an arc attending breakdown of said arcing gaps when the rate of recovery of voltage of said energized conductor is less than a predetermined value, said capacitor being constructed and arranged to concurrently limit the rate of increase of voltage within said last-named winding to a value less than said predetermined rate of increase and the rate of recovery of said energized conductor below said predetermined value.

2. In an electric alternating current transformer having a conducting casing, an assembly within said casing comprising a conducting core and at least one insulating winding carried by said core, means for connecting one end of said winding to a conductor exposed to excess-voltages and means for connecting the other end of said winding to said conducting core, said winding being susceptible to damage due to an excess-voltage of predetermined magnitude impressed between the connected conductor and core, and said winding also being susceptible to damage due to voltage of predetermined rate of increase impressed between the connected conductor and core; the combination of means for preventing damage to said winding, said last-named means including both voltage-limiting and voltage-modifying means, said voltage-limiting means being connected in shunt circuit relation with said winding and embodying spaced normally insulated conducting electrodes arranged to provide at least one spark gap between said connected conductor and core and said voltage-limiting means also embodying arc extinguishing means effective for extinguishing an arc attending flashover of said spark gap when the rate of recovery of voltage is less than a predetermined value, said voltage-modifying means including a capacitor within said casing and electrically connected in parallel with said winding, said capacitor cooperating with said winding and said voltage-limiting means for concurrently preventing damage to said winding and holding said recovery voltage below said predetermined value.

3. In a transformer having a conducting casing, a winding within said casing, a supporting structure for said winding including a conducting core, insulation interposed between said winding and said core, at least one insulated lead extending through said casing, and means for grounding said core; the combination with said transformer of excess-voltage protective means connected in shunt circuit relation with said winding to provide a spark gap between said lead and core, said excess-voltage means being of a type in which the spark gap changes to a voltage-limiting arcing gap at a predetermined excess voltage, and which will change back again to a non-conducting spark-gap when the voltage on said lead returns to normal and when the rate of recovery of the normal voltage applied to said arcing-gap is less than a predetermined value, and means for modifying the rate of recovery of the normal voltage to maintain the rate of recovery at a value less than said predetermined value, said last-named means including a capacitor within said casing and electrically connected in parallel with said spark-gap.

RALPH R. PITTMAN.
CARROLL H. WALSH.